(12) United States Patent
Virolainen et al.

(10) Patent No.: US 9,100,681 B2
(45) Date of Patent: Aug. 4, 2015

(54) VISUAL DATA DISTRIBUTION

(75) Inventors: Antti Virolainen, Helsinki (FI); Panu Akerman, Tampere (FI)

(73) Assignee: Nokia Technologies Oy, Espoo (FI)

( * ) Notice: Subject to any disclaimer, the term of this patent is extended or adjusted under 35 U.S.C. 154(b) by 118 days.

(21) Appl. No.: 13/808,531

(22) PCT Filed: Jul. 8, 2010

(86) PCT No.: PCT/FI2010/050587
§ 371 (c)(1),
(2), (4) Date: Jan. 4, 2013

(87) PCT Pub. No.: WO2012/004447
PCT Pub. Date: Jan. 12, 2012

(65) Prior Publication Data
US 2013/0106815 A1    May 2, 2013

(51) Int. Cl.
*G09G 5/00* (2006.01)
*H04N 21/41* (2011.01)
*G06F 3/042* (2006.01)
*H04N 21/414* (2011.01)
*H04N 21/4223* (2011.01)
*H04N 21/44* (2011.01)
*H04N 21/4728* (2011.01)
*G06F 3/14* (2006.01)
*G09G 3/00* (2006.01)

(52) U.S. Cl.
CPC .......... *H04N 21/4122* (2013.01); *G06F 3/0425* (2013.01); *G06F 3/14* (2013.01); *G09G 5/003* (2013.01); *H04N 21/4126* (2013.01); *H04N 21/41415* (2013.01); *H04N 21/4223* (2013.01); *H04N 21/44008* (2013.01); *H04N 21/4728* (2013.01); *G09G 3/002* (2013.01)

(58) Field of Classification Search
CPC ......... G09G 5/00; G09G 5/003; G09G 5/005; G09G 5/006; G09G 5/02; G09G 3/002; G06F 3/0425; G06F 3/14; H04N 21/4122; H04N 21/41415; H04N 21/4223; H04N 21/4728; H04N 21/4126; H04N 21/44008
See application file for complete search history.

(56) References Cited

U.S. PATENT DOCUMENTS 8,049,721 B2 * 11/2011 Tagawa ......................... 345/158
8,723,787 B2 *  5/2014 Jung et al. ..................... 345/156
(Continued)

FOREIGN PATENT DOCUMENTS

CN         1841290     10/2006
CN       101095098     12/2007
(Continued)

OTHER PUBLICATIONS

EPO Communication together with Extended European Search Report for European Application No. 10854370.3—Date of Completion of Search: Feb. 18, 2014, 8 pages.
(Continued)

*Primary Examiner* — Dwayne Bost
*Assistant Examiner* — Ivelisse Martinez Quiles
(74) *Attorney, Agent, or Firm* — Locke Lord LLP

(57) ABSTRACT

Visual data is presented on a display surface that is visible to users. Visual content presented by a user with a handheld data projector on an image input surface. The detected image is stored and then presented to the user on the display surface. Corresponding apparatus, method and computer programs are disclosed.

19 Claims, 5 Drawing Sheets

(56) References Cited

U.S. PATENT DOCUMENTS

| | | | |
|---|---|---|---|
| 2002/0108108 A1* | 8/2002 | Akaiwa et al. | 725/30 |
| 2003/0122863 A1* | 7/2003 | Dieberger et al. | 345/730 |
| 2003/0210273 A1* | 11/2003 | Yonemura | 345/776 |
| 2003/0222849 A1* | 12/2003 | Starkweather | 345/156 |
| 2004/0141162 A1* | 7/2004 | Olbrich | 353/119 |
| 2004/0203608 A1 | 10/2004 | Osann, Jr. | |
| 2005/0264525 A1* | 12/2005 | Adams et al. | 345/156 |
| 2006/0007123 A1* | 1/2006 | Wilson et al. | 345/156 |
| 2008/0018591 A1* | 1/2008 | Pittel et al. | 345/156 |
| 2008/0268900 A1 | 10/2008 | Lee | |
| 2008/0309619 A1* | 12/2008 | Leung et al. | 345/158 |
| 2009/0040195 A1 | 2/2009 | Njolstad et al. | |
| 2009/0217344 A1* | 8/2009 | Bellwood et al. | 726/1 |
| 2009/0324138 A1* | 12/2009 | Jung et al. | 382/312 |
| 2010/0060803 A1* | 3/2010 | Slack et al. | 348/744 |
| 2010/0066689 A1 | 3/2010 | Jung et al. | |
| 2011/0050720 A1* | 3/2011 | Carter et al. | 345/593 |
| 2011/0130159 A1 | 6/2011 | Chen et al. | |

FOREIGN PATENT DOCUMENTS

| | | |
|---|---|---|
| CN | 101650520 | 2/2010 |
| JP | 2004318823 | 11/2004 |
| WO | WO0227461 | 4/2002 |
| WO | WO2006135241 | 12/2006 |

OTHER PUBLICATIONS

Greaves, A., et al., "View & Share: Supporting Co-Present Viewing and Sharing of Media using Personal Projection", MobileHCI'09, Sep. 15-18, 2009, 4 pages.

PCT Search Report for International Application No. PCT/FI2010/050587—Date of Completion of Search: May 2, 2011, 4 pages.

PCT Written Opinion of the International Searching Authority for International Application No. PCT/FI2010/050587—Date of Completion of Opinion: May 2, 2011, 6 pages.

English Language Machine Translation of Chinese Patent Application Publication No. CN101095098—7 pages.

English Language Machine Translation of Chinese Patent Application Publication No. CN101650520—13 pages.

English Language Machine Translation of Chinese Patent Application Publication No. CN1841290—24 pages.

English Language Machine Translation of Japanese Patent Application Publication No. JP2004318823—99 pages.

* cited by examiner

VISUAL DATA DISTRIBUTION

TECHNICAL FIELD

The present invention generally relates to visual data distribution.

BACKGROUND ART

Video projectors have become ever more compact and light. Presently, there are even some handheld devices with integrated projectors for presenting images on a proximate surface. Such projectors, also known as pico-projectors, operate with modest illumination power and thus correspondingly have a short range such as some tens of centimeters. The pico projectors can produce a far larger display image than an integrated display screen and thus they are seen as a useful enhancement to the user interface of portable devices. However, consumers are reluctant to invest on any new technology unless that technology satisfies needs of the customers. The pico projectors might rapidly become desired by the consumer. On the other hand, it is also possible that this technology remains among many others in the pool that could be nice, but does not quite reach such desirability that would render it ubiquitous.

SUMMARY

According to a first example aspect of the invention there is provided an apparatus comprising:
  a display configured to present visual data on a display surface that is visible to users;
  an image capture unit configured to capture images of an image input surface that is visible to the users; and
    a control unit configured to detect visual content presented by a user with a handheld data projector on the image input surface and to cause presenting of the detected image on the visible surface.

According to a second example aspect of the invention there is provided a method comprising:
  presenting visual data on a display surface that is visible to users;
  capturing images of an image input surface that is visible to the users;
  detecting visual content presented by a user with a handheld data projector on the image input surface; and
  presenting the detected image on the display surface.

According to a third example aspect of the invention there is provided an apparatus comprising:
  means for presenting visual data on a display surface means that is visible to users;
  means for capturing images of an image input surface that is visible to the users; and
  means for detecting visual content presented by a user with a handheld data projector on the image input surface and for causing presenting of the detected image on the visible surface.

According to a fourth example aspect of the invention there is provided a computer program comprising computer executable program code configured to cause an apparatus, when executed, to perform the method according to the second example aspect.

According to a fifth example aspect of the invention there is provided a computer readable memory medium comprising the computer program of the fourth example aspect.

According to a sixth example aspect of the invention there is provided an apparatus comprising:
  a memory configured to store visual content;
  a portable projector configured to project the visual content onto an image input surface of the apparatus of the first example aspect; and
  a user interface configured receive commands from a user and to enable controlling of the portable projector to project the visual content onto the image input surface responsive to receiving of a corresponding command from the user.

The projector may be further configured to project permission content onto the image input surface so as to authorize transfer of the visual content to the apparatus of the first example aspect.

According to a seventh example aspect of the invention there is provided a method comprising:
  storing visual content;
  projecting the visual content by a portable projector onto an image input surface of the apparatus of the first example aspect; and
  receiving commands from a user and controlling the portable projector to project the visual content onto the image input surface responsive to receiving of a corresponding command from the user.

The method may be further comprise projecting permission content onto the image input surface so as to authorize transfer of the visual content to the apparatus of the first example aspect.

According to an eighth example aspect of the invention there is provided a computer program comprising computer executable program code configured to cause an apparatus, when executed, to perform the method according to the seventh example aspect.

According to a ninth example aspect of the invention there is provided a computer readable memory medium comprising the computer program of the eighth example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

Some example embodiments of the invention will be described with reference to the accompanying drawings, in which:

FIG. 3 shows a block diagram of a user apparatus of FIG. 1a; and

DETAILED DESCRIPTION

In the following description, like numbers denote like elements.

Figure 1A:
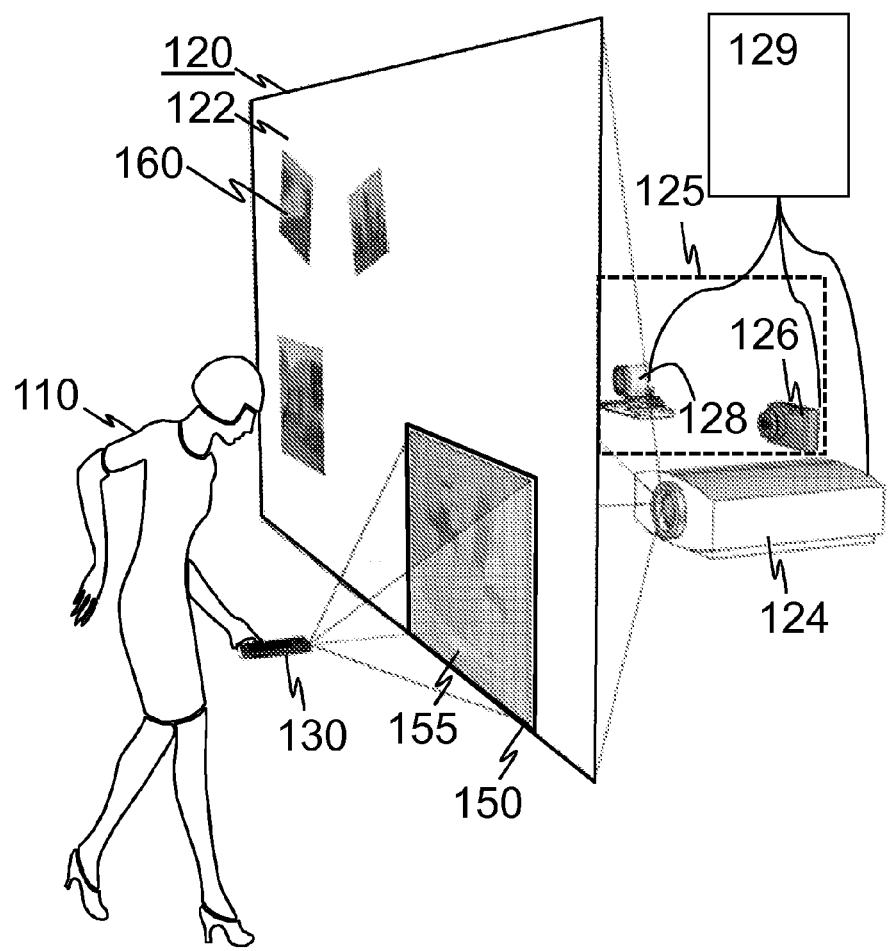
FIG. 1a shows a schematic picture of a system according to an embodiment of the invention.

FIG. 1a shows a schematic picture of a system 100 according to an embodiment of the invention. The system comprises a display 120 and a user apparatus 130 (also referred to as a pico projector) that is held by a user 110. The user apparatus 130 has a data projector 365 (shown in FIG. 3). The display 120 has a display surface 122 that is visible to users, a display projector 124 for casting visual data on the display surface 122, and an image capture unit 125 that comprises one or more image capture devices such as a camera 126 and/or a video camera 128 and that is configured to capture images of an image input surface 150. The term "images" refers to either still or live images. The display 120 further has a control unit 129 configured to detect visual content 155 presented by the user 110 with the user apparatus 130 on the image input surface 150 and to cause the display 120 to present the detected image on the display surface 122.

The display surface 122 is configured to show one or more visual regions 160 each corresponding to one visual content item. The visual content items may be images, slideshows, and/or videos. Some or all of the visual content items may be earlier obtained visual content 155.

The display surface 122 may comprise the image surface 150. Moreover, the display surface 122 may be the image input surface 150 as is drawn in FIG. 1a. Alternatively, the image input surface 150 may be a surface that does not form part of the display surface 122, in which case the image input surface 150 would be used to input images cast by the user with the user apparatus 130 but not for displaying visual data with the display projector 124.

While this example demonstrates a system with a rear-projector display system, it is appreciated that the display 120 need not be based on a rear projector. To the contrary, the display 120 may comprise one or more front projectors or the display may comprise a display panel such as a light emitting diode (LED) based panel, plasma display panel or organic light emitting device (OLED) that produces images without projectors.

Let us consider the example embodiment illustrated by FIG. 1a with some further detail. First, when a user projects visual content 155 on the image input surface 150, light projected by the user apparatus 130 onto the image input surface 150 will only partly reflect from the image input surface 150. In particular, with a rear-projector system, where the display surface 122 is used as the image input surface 150, a large portion of the light penetrates through the display surface 122. Hence, the image capture unit 125 (the camera 126 and/or video camera 128) will capture images or video footage with far better contrast than that the user sees on the display surface 122. Once the projector 124 projects back the captured visual content 155, the visual content 155 typically has far better image quality (contrast and brightness) than what the user could experience on casting the visual content 155 onto the display surface 122 in the first place. Due to scarce energy resources and space within the user apparatus 130, built-in projectors tend to have relatively modest projection brightness and contrast, but the inventors have also invented this surprising advantageous effect on testing their invention.

Figure 1B:
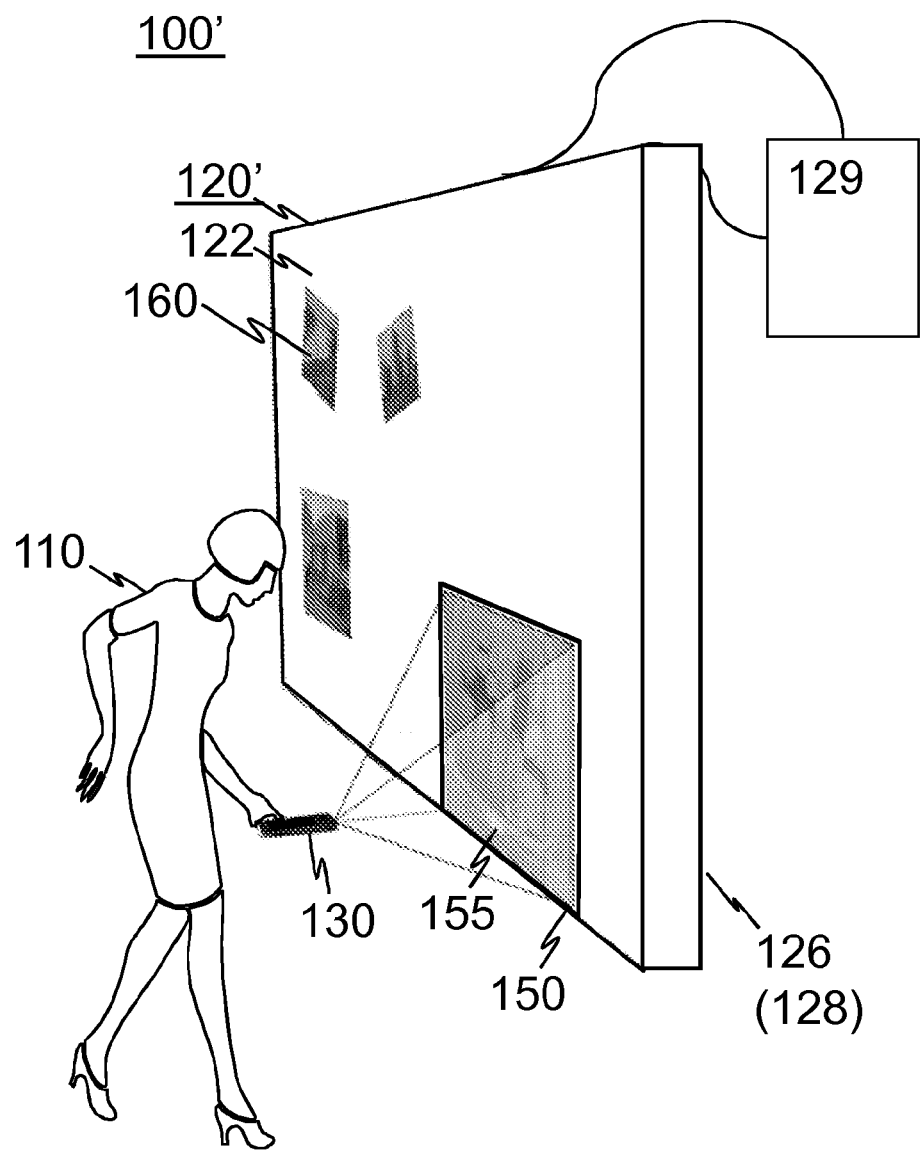
FIG. 1b shows a schematic picture of a system according to an embodiment of the invention.

FIG. 1b shows a schematic picture of a system 100' according to an embodiment of the invention. The system 100' of FIG. 1b corresponds to that of FIG. 1a except that a display 120' is shown that has the camera 126 and/or the video camera 128 incorporated in or adjacently behind the display surface 122.

Figure 2:
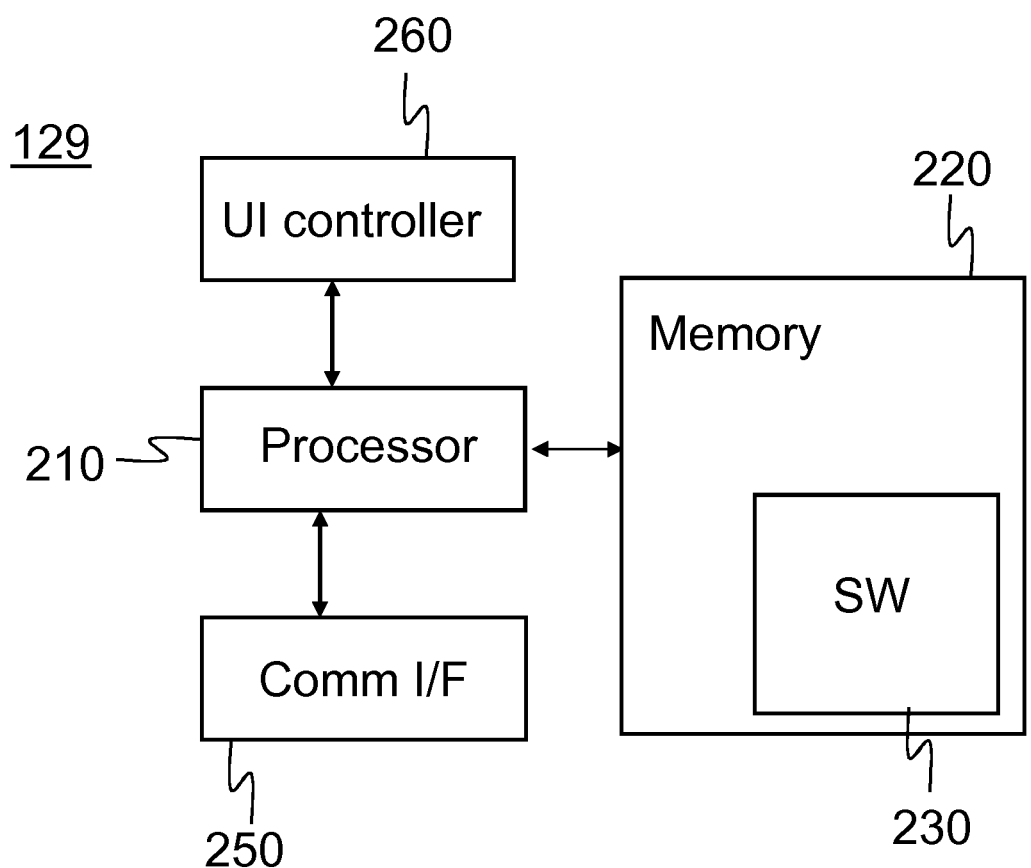
FIG. 2 shows a block diagram of a control unit according to an embodiment of the invention.

FIG. 2 shows a block diagram of a control unit according to an embodiment of the invention. The control unit may be based on a common personal computer, a game console or even on a portable data processing device such as a mobile phone, personal digital assistant or the like.

The control unit 129 may comprise a communication interface 250. Further, the control unit comprises a processor 210 communicatively connected to the communication interface 250 (if present), a memory 220 communicatively connected to the processor 210, and computer executable software 230 stored in the memory 220 and operable to executed by the processor 210. The control unit 129 further comprises a user interface controller 260 communicatively connected to the processor 210.

The communication interface 250 may comprise, for instance, a radio interface such as a wireless local area network (WLAN), Bluetooth, GSM/GPRS, CDMA, WCDMA, or LTE (Long Term Evolution) radio interface. Alternatively or additionally, the communication interface 250 may comprise a fixed communication connection port such as a local area network connector, universal serial bus connector, RS-232 connector, or IEEE-1394 connector (i.e. Firewire® connector). The communication interface module 250 may be integrated into the control unit 129 or into an adapter, card or the like that may be inserted into a suitable slot or port of the control unit 129. Moreover, or alternatively, the communication interface module 250 may support one radio interface technology or a plurality of technologies.

The processor 210 generally refers to any suitable processing circuitry. The processing circuitry may comprise, for instance, a control unit (MCU), a microprocessor, a digital signal processor (DSP), an application specific integrated circuit (ASIC), a field programmable gate array, a microcontroller or a combination of such elements. It is also appreciated that the processor 210 may comprise one or more processing circuitries.

The memory 220 may comprise for example any of a volatile memory, a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The control unit 129 may comprise a plurality of memories. The memory 220 may be constructed as a part of the control unit 129 or it may be inserted into a slot, port, or the like of the control unit 129 by a user. The memory 220 may serve the sole purpose of storing data, or it may be constructed as a part of a control unit serving other purposes, such as processing data.

The user interface controller 260 may comprise a display control circuitry (not shown) for controlling the display projector 124 (or any other type of image forming device of the display 120) and an image capture control circuitry for recording with the image capture unit 125 (e.g. camera 126 and/or video camera 128) visual content 155 cast by the user apparatus 130 onto the image input surface 150. The display control circuitry and the image capture control circuitry may comprise any suitable analogue and/or digital interfaces depending on the peer units. For instance, the display control circuitry may comprise a display driver circuitry and display connection port such as a Video Graphics Array (VGA) connector, High-Definition Multimedia Interface (HDMI) connector and/or a Digital Visual Interface (DVI) connector.

Moreover, the user interface controller 260 may comprise a user input circuitry for receiving input from a user of the control unit 129, e.g., via a keyboard, graphical user interface shown on the display of the control unit 129, speech recognition circuitry, or an accessory device, such as a headset.

A skilled person appreciates that in addition to the elements shown in FIG. 2, the control unit 129 may comprise other elements, such as microphones as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the control unit 129 may comprise a disposable or rechargeable battery (not shown) for powering the control unit 129 when external power if external power supply is not available.

Figure 3:
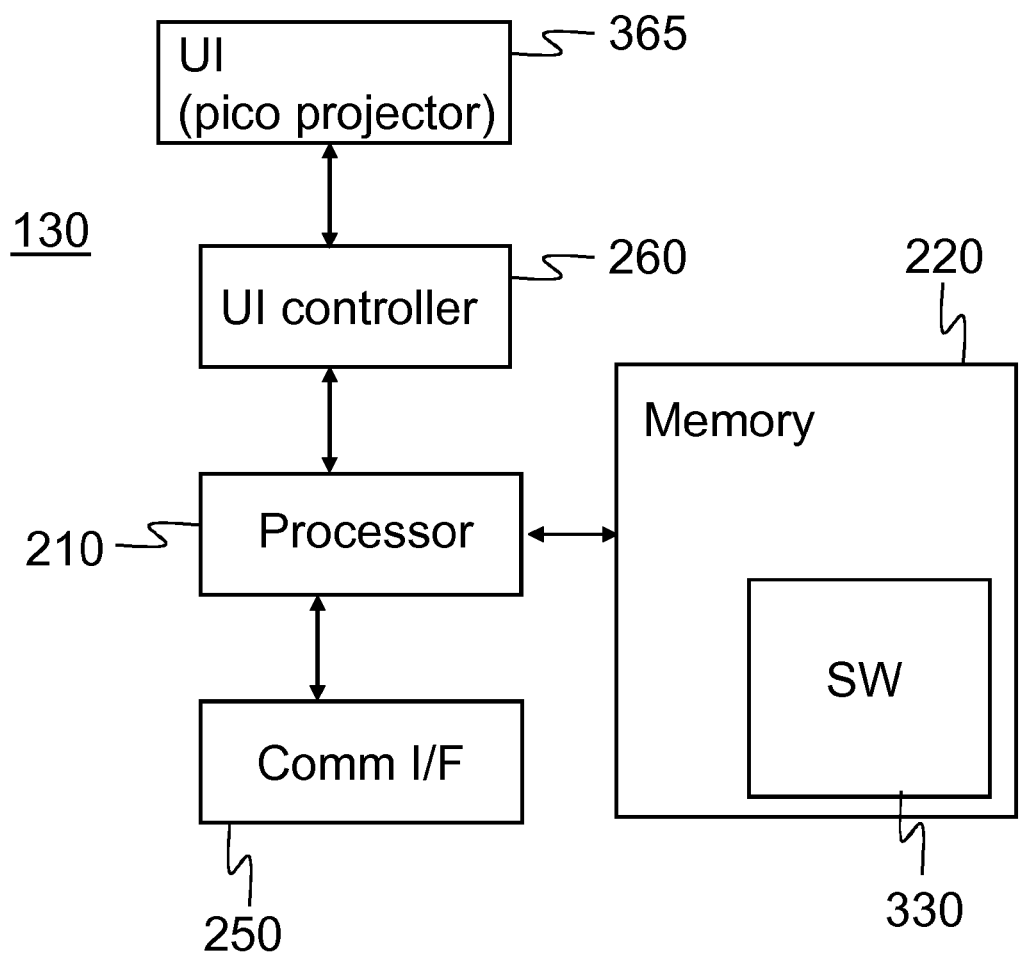

FIG. 3 shows a block diagram of a user apparatus 130 of FIG. 1 FIGS. 1a and 1b. The basic structure of the user apparatus 130 may correspond to that of the control unit 129. Hence, various elements are denoted with like reference signs with FIG. 2. However, the software contained in the memory 220 is denoted with reference sign 330 because it invokes different operation than that of the control unit 129. The communication interface of the user apparatus 130. Moreover, the user apparatus 130 comprises a user interface 365 which comprises at least the data projector (mentioned in connection with FIGS. 1a and 1b) for casting visual content 155 onto the image input surface 150. Further, the user interface 365 may comprise a display, a keypad or touch detection device on a dedicated surface or in connection with the display, a camera, a microphone and/or a speaker. The user apparatus 130 may be a handheld device such as a mobile telephone, personal digital assistant, camera, game device, navigation device, and/or any combination thereof. In many of the example embodiments, the user apparatus need not be modified over existing models as long as the user apparatus is capable of projecting visual content 155 onto the image input surface 150.

Figure 4:
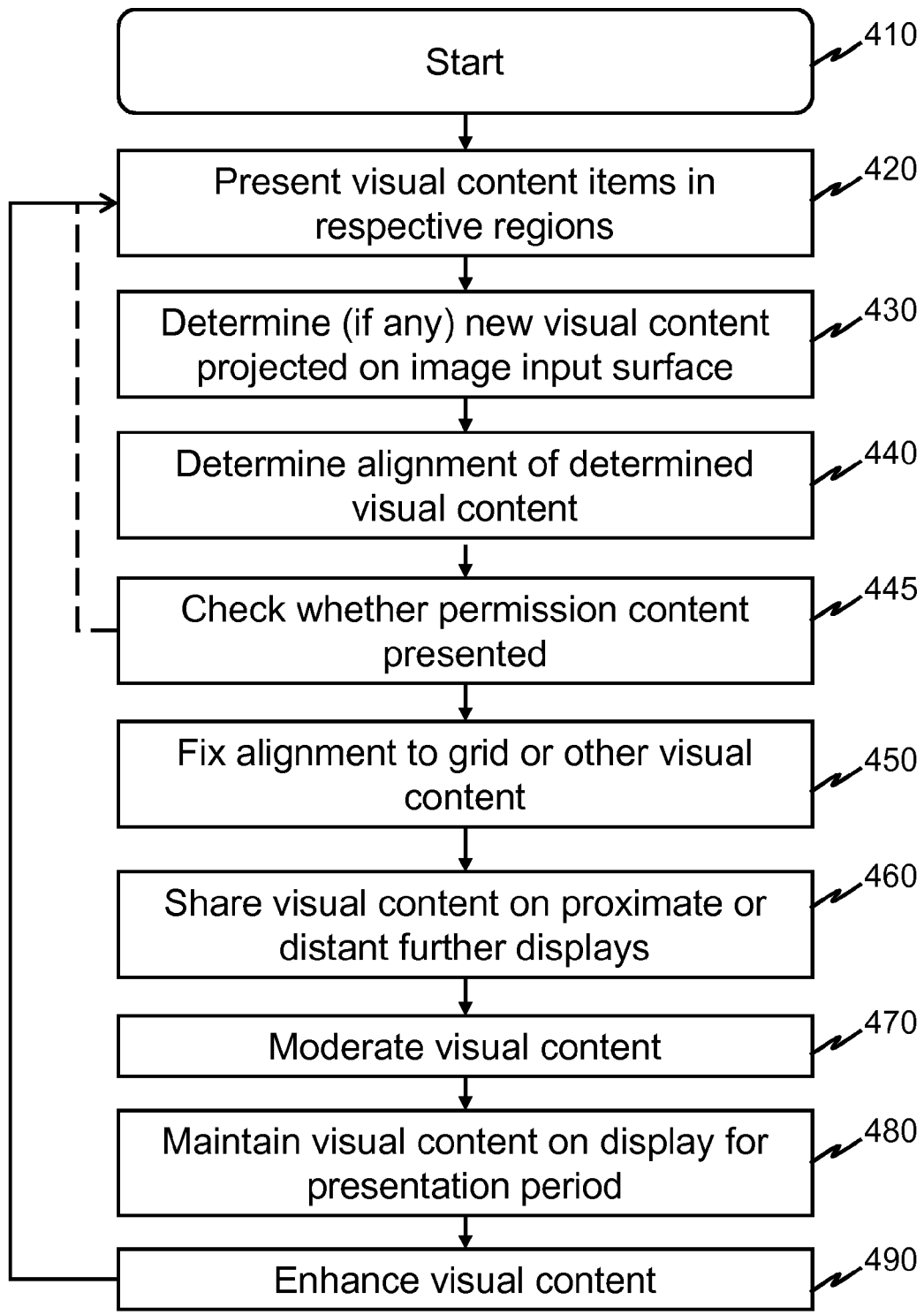
FIG. 4 shows a flow chart illustrating a process according to an embodiment of the invention to demonstrate operation in a control unit.

FIG. 4 shows a flow chart illustrating a process 400 according to an embodiment of the invention to demonstrate operation in the control unit 129. The process starts from block 410 in which the control unit 129 is started and running. The control unit 420 causes presenting of visual content items in respective one or more visual regions 160. These content items may originate from a variety of different sources such as news services, television broadcasts, and information services of a traffic operator. The visual content 155 may comprise e.g. photos, messages, videos or slide shows received from users. Next, the control unit 129 causes 430 determining what if any new visual content 155 is being projected onto the image input surface and storing of such visual content 155 into the memory 220. The determining of visual content 155 may be based on a triggering event. The triggering event may be selected from a group consisting of: detecting visual content 155 that is sufficiently well focused; detecting an image or video that is kept sufficiently still with relation to the display surface 122; detecting an optical sign provided by the user (for instance, nodding of head, gesture such as thumb up, moving the projector before or after "burning" next to the reflector surface); detecting an acoustic signal (user's shout, yell, voice command, or an acoustic signal given by the user apparatus 130); detecting actuation of a dedicated or soft key (e.g. with a touch display as or in connection with the display 120).

As mentioned in on describing of FIGS. 1a and 1b, the image input surface 150 may be outside of the display surface 122, but we are here considering the case in which the display surface 122 is also used as image input surface 150. Typically, the display surface 122 is far larger than the image projected with the user apparatus 130, and the control unit 129 may also cause determining 440 of the alignment of the determined visual content 155 in relation to the display surface.

The determination of the visual content 155 and its alignment (430,440) may be performed by the control unit 129 itself or by a separate processor or determination circuitry or circuitries within or in communicative connection with the image capture unit (126,128).

The control unit 129 may check 445 for permission content that identifies the user's permit to feed his or her visual content 155 with the display 120. Such permission content may comprise, for instance, a bar code, a 2D bar code, a code word or an image that is compared with one or more key images before the user is granted with a permission to provide his or her visual content 155. The use of a visual key as an authorization to use the display 120 for feeding in own visual content 155 does not necessitate forming any prior existing relationship between the user apparatus 130 and the display 120. Also the verifying of the permission may be carried out either by the control unit 129 or by another data processing element that is communicatively connected with the control unit 129. For instance, making use of the railway operator example, each passenger may be allowed to use the train ticket's picture that can be conveniently photographed by a camera phone, as a permit to use the display 120 to a given extent (e.g. for publishing of one image or video). Further using the railway operator example, the staff may be provided with a privileged user image. Projecting of the privileged user image on the image input surface 150 causes the control unit 129 to keep the next provided visual content 155 (e.g. on same or any part of the image input surface) until the same or another member of the staff enters the same or similarly privileged user image. The image input surface 150 may also be used to identify a desire to remove the visual content 155 when, for instance, the user 110 is showing the same visual content 155 again or dragging with a hand that visual content 155 out of the image surface 122.

The verifying of various permission images may be performed, as mentioned, by a separate communicatively connected data processor or by the control unit 129. In the latter case, the control unit should be fed with comparison data to use for recognizing such permission images. This feeding of comparison data may be performed, for instance, over a secure data tunnel over the Internet, from virtually anywhere in the world, via a local data bus, using a user interface connected to the UI controller 260, or by entering a suitably encoded memory module to the memory 220, for instance.

It is appreciated that the checking of permission content may take place before and/or after projecting of the visual content 155. In the embodiment in which the checking 445 of permission content is carried out and such content has been previously detected either in connection with previously determined visual content 155 or within a given period of time such as ten seconds, the process continues next to step 450. However, if the permission content has not been detected, the process resumes to step 420.

On arriving at step 450, the control unit 129 is in possession of the visual content 155 and then processes the visual content 155 in one or more of various ways. In one example embodiment, the control unit 129 burns or paints the image onto the display surface 122 as presented by the user apparatus 130. The term burning in this context refers to keeping the visual content 155 visible practically in the place in which the visual content 155 was presented by the user of the user apparatus 130. For instance, the visual content 155 may be merged into an image memory (not shown) of the UI controller 260. In case of video content, the recorded video is rendered in place of its capture, in this example embodiment. It is yet appreciated that, the video may slightly move along the display surface 122 due to hand shake of the user during the capture of the visual content 155 by the video camera 128 and the video may be stabilized and output at a constant alignment e.g. where the capture started, ended or at an average alignment.

By capturing visual content 155 and thereafter maintaining the visual content 155 visible on the display surface 122, the user may be provided with extremely intuitive functionality. The user may e.g. leave a message or greeting to others who pass by the display 120 simply by beaming desired visual content 155 onto the display surface 122, at desired alignment.

The alignment may be fixed 450 to a grid or to other content items that are being presented on the display surface 122 (such as other visual content, news clips etc.). The alignment of new visual content 155 may be allowed to overlap with earlier captured visual content 155.

The visual content 155 may be shared 460 on one or more proximate or distant other displays. For instance, there may be respective displays 120 on two or more sites of a railway operator in connection with one another so that people passing either display may cast their visual content 155 onto displays at both sites.

The capturing of projected visual content 155 and subsequent presentation thereof enables sharing of the visual content 155 by anyone with a portable data projector, without need for establishing wired or wireless connections, passwords, pairing of peers or the like. With interconnected displays on one or more sites it is further possible to add visibility of the visual content 155 and/or to provide larger selection of such visual content 155.

The control unit 129 may also provide for moderation 470 prior to reproducing the visual content 155. The moderating 470 may include, for instance, passing the visual content 155 for approval of a moderating person or automatic detection of undesired content such as nudity, violence and/or bad language. The moderation may further comprise displaying, while the visual content 155 is being approved, a place holder in place of the visual content 155. The visual content 155 may be first instantaneously displayed on the display surface 122 so as to confirm to the user successful capture of the visual content 155 before the visual content 155 is being obscured or removed for subsequent processing. The place holder may comprise, for example, a textual or graphical indication of the pending approval process or its current stage, a modified version (e.g. a blurred or posterized) of the captured visual content 155. Once the approval is complete, the visual content 155 is presented for a substantial period of time i.e. for a period that is sufficient for people to watch the visual content 155 on the display surface 122. In case that the visual content 155 is shared on one or more further displays, the visual content 155 may be held back until the approval is complete so as not to flash potentially unacceptable content on the other displays.

The control unit 129 may maintain presentation of the captured content items only for a given presentation period, 480. The presentation period may be a constant. Alternatively, the control unit 129 may determine signals indicative of desired reduction or increase in the presentation period and respectively shorten or extend the presentation period. The signals indicative of changing of the presentation period may be provided by different users e.g. by touching the display 120 at a given visual content 155 in a particular manner. For instance, a user may drag the given visual content 155 towards an edge of the display surface so as to shorten the presentation period and in response the control unit 129 may move that the visual content 155 or change the speed at which the visual content 155 is shifted out of the display surface. Namely, in an example embodiment, some or all of the visual content 155 may be kept in slow motion towards the edges so that the oldest visual content 155 disappears in time over an edge of the display surface 122. By dragging visual content 155 towards the edge or away from the edge, users may change the presentation period. The change may be intuitively indicated by shifting the visual content 155 or changing the speed at which the visual content 155 moves out of the display surface 122.

Various items of the visual content 155 may be handled on the first in-first out principle unless the maintenance period is changed by one or more users.

The moving of the visual content 155 out of the display surface 122 may indicate the approximate age and/or users' rating as the visual content 155 that is older or less liked appears closer to being removed from the display 120. It shall be appreciated that the moving of the visual content 155 out of the display surface 122 is merely one illustrative alternative. Additionally or alternatively, the visual content 155 may be faded out or any other visual transition may be used to gradually remove the visual content 155 from displaying and that transition may be driven forward or backward.

The control unit 129 may also enhance 490 the visual content 155 in various ways. It was also mentioned that video capture may be stabilized to compensate effect of hand shake. Moreover, the visual content 155 may suffer from various geometrical errors which may be corrected by the control unit 129 (e.g. trapezoid correction/straighten by rotating to nearest of horizontal and vertical axis). Further, the camera 126 may be configured to sequentially take high-resolution images (e.g. 10 Mpixel images at a rate of 0.1 to 10 frames/ second, typically at a rate of 1 to 3 frames per second). Thus, there may be more than one frames captured that represent a particular visual content 155 (that is a still image) and the control unit 129 may then select the visual content 155 that has the sharpest details, best contrast and/or lowest amount of geometrical error.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
an image input surface that is visible to users;
an image capture unit configured to capture images of the image input surface;
a control unit configured to detect visual content projected by a user with a handheld data projector on the image input surface, the visual content comprising at least one item selected from a group comprising: an image; a slideshow; and a video;
a display surface that is visible to the users; and
a display configured to display the detected visual content on the display surface under control of the control unit in response to the detecting of the visual content being projected with the handheld data projector on the image surface;
wherein the control unit is further configured to cause the displaying of the visual content in a manner that maintains a visual appearance of the visual content on the display when projected by the user.

2. The apparatus of claim 1, wherein the display surface comprises the image input surface.

3. The apparatus of claim 1, wherein the display surface is the image input surface.

4. The apparatus of claim 1, wherein the control unit is further configured to cause storing of the detected image in a memory.

5. The apparatus of claim 1, wherein the detecting of the visual content projected by the user is based on a predetermined triggering event.

6. The apparatus of claim 5, wherein the triggering event is selected from a group comprising: detecting visual content that is sufficiently well focused; and detecting an image or video that is kept sufficiently still with relation to the display surface.

7. The apparatus of claim 1, wherein the control unit is further configured to maintain the displaying of the detected visual content only for a given displaying period.

8. The apparatus of claim 7, wherein the control unit is further configured to gradually remove the visual content from the display.

9. The apparatus of claim 7, wherein the control unit is further configured to provide a visual indication of a remaining part of the given displaying period.

10. The apparatus of claim 7, wherein the control unit is further configured to allow users, during the given displaying period, to increase or decrease the given displaying period.

11. The apparatus of claim 1, further comprising a communication interface configured to exchange visual content with one or more auxiliary devices.

12. The apparatus of claim 1, further comprising a moderation circuitry configured to enable approving of the visual content and further configured to prevent or stop the displaying of the determined content until the approving of the visual content.

13. The apparatus of claim 1, wherein the image capture unit is further configured to detect permission content and the control unit is further configured to subject the displaying of the visual content to the detecting of the permission content.

14. A method comprising:
capturing images of an image input surface that is visible to the users;
detecting visual content projected by a user with a handheld data projector on the image input surface, the visual content comprising at least one item selected from a group comprising: an image; a slideshow; and a video; and
displaying a detected image on a display surface that is visible to the users in response to the detecting of the visual content being projected by the user with the handheld data projector on the image surface, in a manner that maintains a visual appearance of the visual content on the display when projected by the user.

15. The method of claim 14, further comprising using of the display surface as the image input surface.

16. The method of claim 14, wherein the detecting of visual content is based on a predetermined triggering event.

17. A computer program product comprising a non-transitory computer readable storage medium having computer executable program code stored thereon, wherein said program code is configured to, when executed, cause an apparatus to perform the method of claim 14.

18. A system comprising:
an apparatus and a handheld device;
the apparatus comprising an image input surface that is visible to users;
the handheld device comprising:
a memory configured to store visual content; and
a projector configured to project the visual content onto the image input surface, the visual content comprising at least one item selected from a group comprising: an image; a slideshow; and a video;
the apparatus further comprising:
an image capture unit configured to capture images of the image input surface;
a control unit configured to detect visual content projected by a user with a handheld projector on the image input surface; and
a display surface that is visible to the users;
a display configured to display a detected image on the display surface under control of the control unit in response to the detecting of the visual content being projected with the handheld projector on the image input surface, in a manner that maintains a visual appearance of the visual content on the display when projected by the user;
the handheld device further comprising:
a user interface configured receive commands from a user and to enable controlling of the handheld projector to project the visual content onto the image input surface responsive to receiving of a corresponding command from the user.

19. The system of claim 18, wherein the projector is further configured to project permission content onto the image input surface and the control unit is configured to detect the permission content based on the captured images and to responsively authorize transfer of the visual content to the apparatus.

* * * * *